July 28, 1925.  
W. S. C. GLOVER  
1,547,211  
TRANSMISSION BAND APPLICABLE TO FORD MOTOR VEHICLES  
Filed Oct. 15, 1923  
2 Sheets-Sheet 1
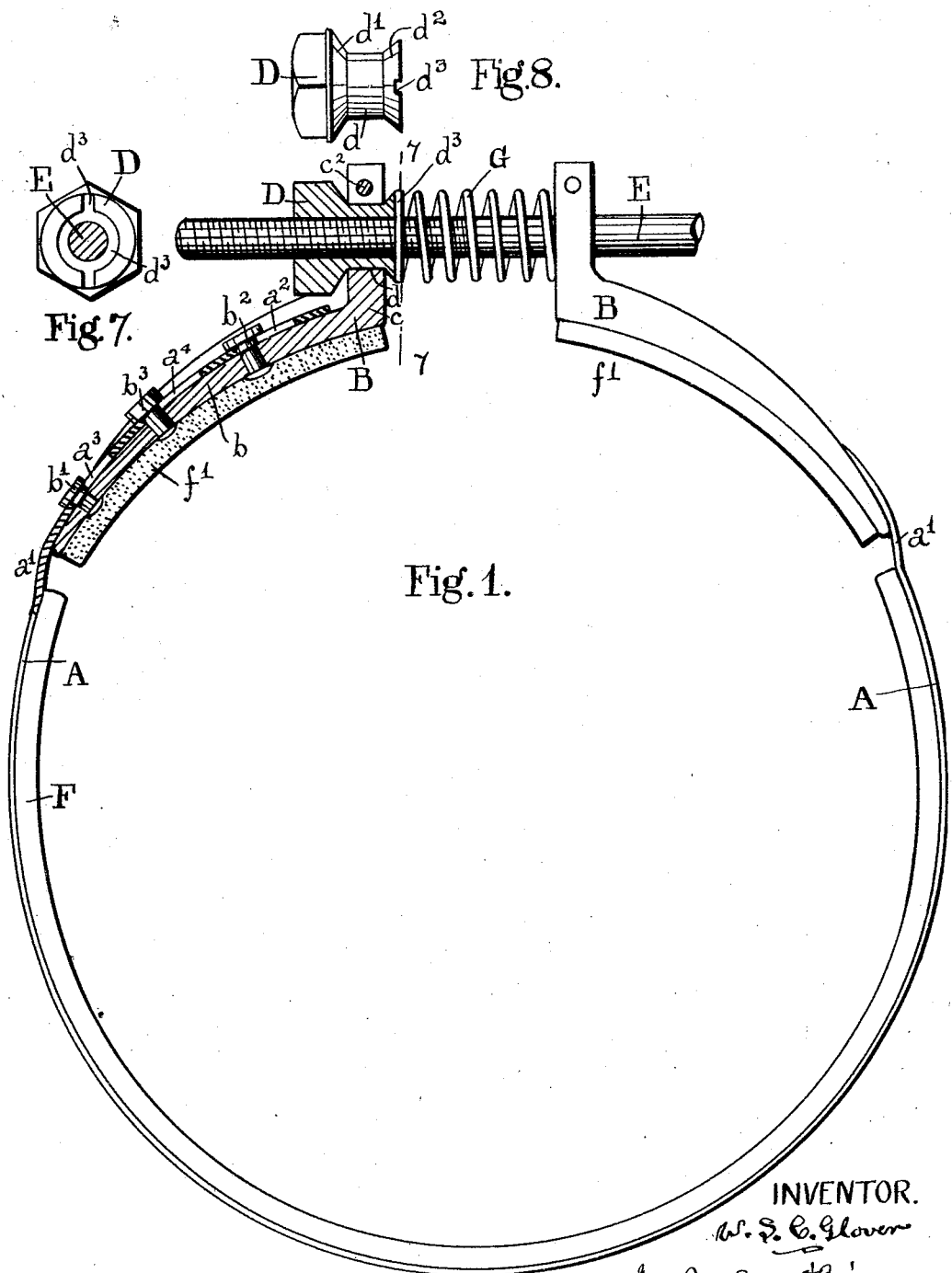
INVENTOR.  
W. S. C. Glover

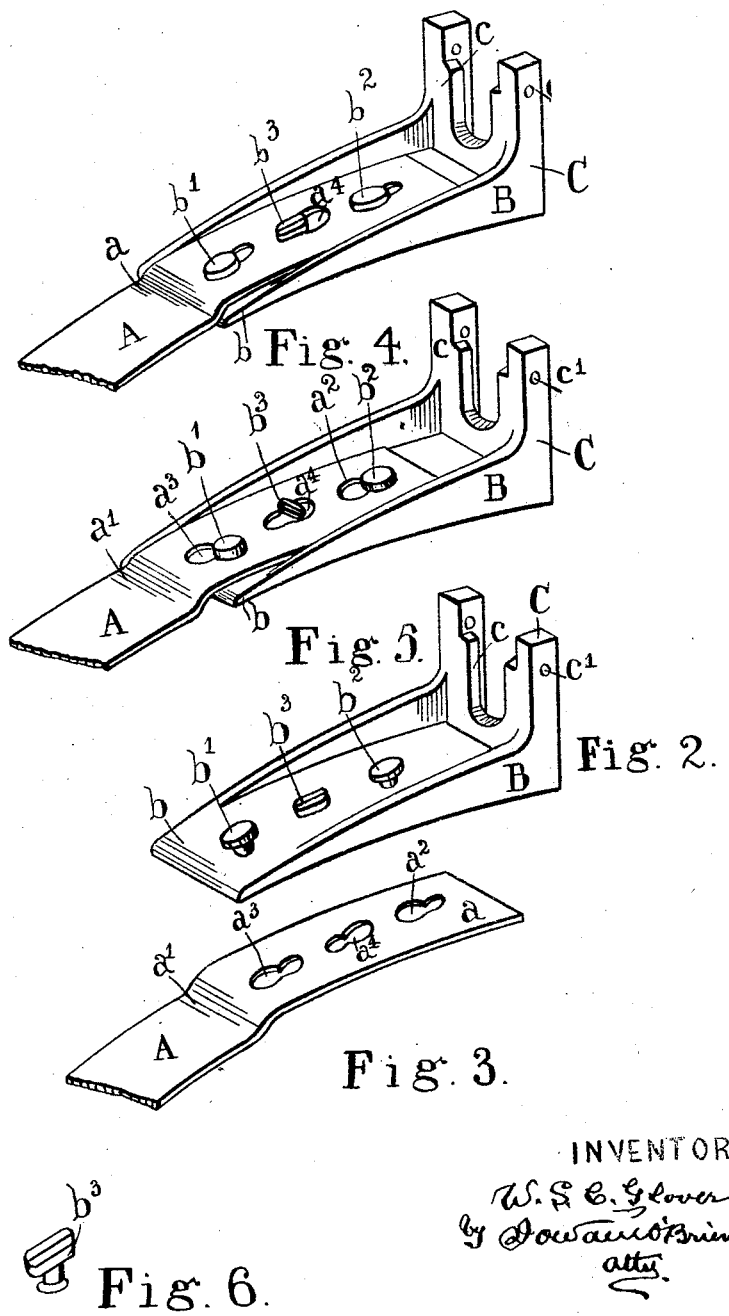

Patented July 28, 1925.

1,547,211

UNITED STATES PATENT OFFICE.

WILLIAM S. C. GLOVER, OF OXFORD, ENGLAND.

TRANSMISSION BAND APPLICABLE TO FORD MOTOR VEHICLES.

Application filed October 15, 1923. Serial No. 668,759.

*To all whom it may concern:*

Be it known that I, WILLIAM STEPHEN COX GLOVER, a British subject residing at Oxford, county of Oxford, England, have invented certain new and useful Improvements in Transmission Bands Applicable to Ford Motor Vehicles, of which the following is a specification.

This invention relates to improvements in the transmision bands employed on the transmission drums of Ford and other motor vehicles.

These bands are lined with friction material and provided with lugs at the end to engage with the levers or shafts operating the bands and as usually constructed the lugs are permanently secured to the bands rendering the removal of the bands for re-lining or other purposes difficult or impossible without dismantling the transmission case, although such transmission bands have been formed with a detachable lug or lugs.

According to the invention a detachable lug is mounted on one or both ends of the band, this lug being formed with a number of pins or studs which engage with key-hole slots in the end of the band and with a lock nut or stud to lock the lug securely in position.

The invetnion will be fully described with reference to the accompanying drawings.

Fig. 1 is an elevation of transmission band showing one detachable lug in section.

Fig. 2 is a perspective view of detachable lug.

Fig. 3 is a perspective view of end of the transmission band.

Fig. 4 is a perspective view of detachable lug showing the end of the transmission band passed over the studs but before being drawn into the final position.

Fig. 5 is a perspective view of detachable lug showing the end of the transmission band in the final position and the locking nut turned to retain it therein.

Fig. 6 is a perspectice view of the locking nut.

Fig. 7 is a section of the adjusting nut D on line 7—7 Fig. 1 showing slot $d^3$.

Fig. 8 is an elevation of adjusting nut D.

The transmission band A may be provided on one or both ends with a detachable lug or lugs B. Each detachable lug B is provided with two flat headed studs $b'$ $b^2$ riveted or otherwise affixed to the base $b$ of the lug, the neck of each stud being of sufficient length to take the thickness of the transmission band A. A locking stud $b^3$ with a flat sided head is rotatably mounted in the base $b$ and provided with a groove or saw cut in the head so that it can be rotated by a screw-driver.

The end of the lug B is formed with projections or jaws C at right angles to the base of the lug and these projections or jaws are formed with a collar $c$ which fits into a groove $d$ in the adjusting nut D on the operating bar E. Holes $c'$ are drilled in the jaws C above the collar to receive a pin $c^2$ which retains the adjusting nut D in position and prevents it from being removed from the lug when slacked off for detaching. This prevents the nut from being dropped into the transmission casing the risk of which is a great disadvantage in the usual type of transmission bands as it is difficult to remove the nut when it has dropped into the casing.

The adjusting nut D is chamfered at $d^1$ and $d^2$ to allow the nut D to rock in the lug B so that the two lugs may approach each other when the brake is applied. The nut D is also formed with a slot $d^3$ to house the end of the spring G which prevents the nut D from working loose.

The end $a$ of the transmission band A is cranked at $a'$ to allow it to ride up over the base $b$ of the lug and so allow the inner surfaces of the linings F $f'$ to be concentric. The end $a$ is provided with the key-hole slots $a^2$ $a^3$ to receive the studs $b'$ $b^2$ and a key-hole slot $a^4$ to receive the locking stub $b^3$.

The lining F which is of the ordinary renewable type does not extend beneath the detachable lug or lugs but only to the point $a'$ where the transmission band is cranked, being riveted to the band at or near this point so that it will not have any loose overhanging end. A permanent piece of lining material $f'$ is affixed on the underside of the lug B to complete the circle.

To affix the band A to the lug B the adjusting nut D held in the jaws C is screwed on to the operating rod E to such a position as will allow the end of the band A to be placed over the lug B so that the enlarged portion of the key-hole slots $a^2$ $a^3$ pass over studs $b'$ $b^2$ and the locking stud $b^3$ passes through the narrow end of the slot $a^4$ (Fig. 4). The lug is then drawn forward till the locking stud $b^3$ can be rotated in the large end of the slot $a^4$ to the position shown in Fig. 5. To remove the band A from the lug the nut D is slackened or removed from the rod E the locking stud $b^3$ rotated to the position shown in Fig. 4, and the lug moved back until the end of the band can be slipped off the studs.

What I claim as my invention and desire to protect by Letters Patent is:—

1. In an automobile transmission band the combination with said band of cranked ends thereon, detachable lugs affixed to the underside of the cranked ends, a strip of lining material on the underside of the band extending from one cranked portion to the other, separate strips of lining material on the underside of the cranked ends, means for holding the detachable lugs on the underside of the cranked ends and means for tightening the band.

2. In an automobile transmission band the combination with said band of cranked ends thereon, detachable lugs affixed to the underside of the cranked ends, a strip of lining material on the underside of the band extending from one cranked portion to the other, separate strips of lining material on the underside of the cranked ends, means for holding the detachable lugs on the underside of the cranked ends, a screwed operating rod between the lugs, a grooved nut carried by one lug, a spring surrounding the operating rod and anchored to the grooved nut and means for preventing longitudinal movement of the nut.

In testimony whereof I have hereunto set my hand in presence of two subscribing witnesses.

WILLIAM S. C. GLOVER.

Witnesses:
ROBERT EAST,
P. BATES.